United States Patent
Beckmann et al.

(10) Patent No.: US 9,350,895 B1
(45) Date of Patent: May 24, 2016

(54) AUDIO SIGNAL LEVEL ESTIMATION IN CAMERAS

(71) Applicant: GoPro, Inc., San Mateo, CA (US)

(72) Inventors: Paul Beckmann, Sunnyvale, CA (US); Erich Tisch, San Francisco, CA (US); Eric Jing, Belmont, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 14/548,146

(22) Filed: Nov. 19, 2014

(51) Int. Cl.
*H04N 5/228* (2006.01)
*H04N 1/21* (2006.01)

(52) U.S. Cl.
CPC .................... *H04N 1/2125* (2013.01)

(58) Field of Classification Search
CPC .............. H04N 1/2125; H04N 21/439; H04N 21/4392; H04N 21/4394
USPC ...................................... 348/222.1
See application file for complete search history.

(56) References Cited

U.S. PATENT DOCUMENTS

| | | | | |
|---|---|---|---|---|
| 4,953,221 A | * | 8/1990 | Holly | H03G 3/32 381/108 |
| 8,754,962 B2 | * | 6/2014 | Seo | H04N 5/262 348/240.1 |

* cited by examiner

*Primary Examiner* — Yogesh Aggarwal
(74) *Attorney, Agent, or Firm* — Fenwick & West LLP (57) ABSTRACT

A camera system includes a first microphone, a second microphone, and a microphone controller. The first microphone and the second microphone are configured to capture audio over a time interval to produce a first captured audio signal and a second captured audio signal, respectively. The second captured audio signal is dampened relative to the first captured audio signal by a dampening factor. The microphone controller is configured to store the first captured audio signal in response to a determination that the first captured audio signal does not clip. In response to a determination that the first captured audio signal clips, the microphone controller is configured to identify a gain between the first captured audio signal and the second captured audio signal representative of the dampening factor, amplify the second captured audio signal based on the identified gain, and store the amplified second captured audio signal.

17 Claims, 7 Drawing Sheets

AUDIO SIGNAL LEVEL ESTIMATION IN CAMERAS

BACKGROUND

1. Technical Field

This disclosure relates to a camera system, and more specifically, to the selection of a microphone in a multiple-microphone camera system.

2. Description of the Related Art

Digital cameras are increasingly used in outdoors and sports environments. In such environments, the magnitude of audio captured (for instance, by a camera in conjunction with captured video) can often exceed a microphone's capabilities, causing the captured audio to clip. As used herein, "clipped audio" refers to an audio signal captured by a microphone in which the magnitude of the audio signal exceeds the capabilities of the microphone (such as an audio threshold), resulting in captured audio data that does not represent the portions of the audio signal that exceed the audio threshold of the microphone. Such clipped audio has a lower signal-to-noise ratio ("SNR") than the captured audio signal, decreasing the quality of the clipped audio as compared to the original captured audio signal. Clipped audio can diminish a user's experience during playback of the captured audio, and accordingly can diminish a user's experience with a device (such as a camera) used to capture the audio.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

Cameras can use multiple microphones to effectively increase the dynamic range of the microphones. Such cameras can record extremely loud sound without clipping. For example, some cameras include dual membrane microphones. In a dual-membrane microphone, two separate microphone capsules are located in close proximity of each other, and each microphone includes a different sound sensitivity. As a result, the microphones capture substantially the same sound but generate different audio signals. For instance, a first of the microphones has a much higher gain than a second of the microphones, and the audio signal captured by the first microphone has a much greater amplitude than the audio signal captured by the second microphone.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system includes a camera and a camera housing structured to at least partially enclose the camera. The camera comprises a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing includes a lens window structured on the front surface of the camera housing and configured to substantially align with the camera lens, and one or more indicator windows structured on the front surface of the camera housing and configured to substantially align with the camera indicators.

Figure 1A:
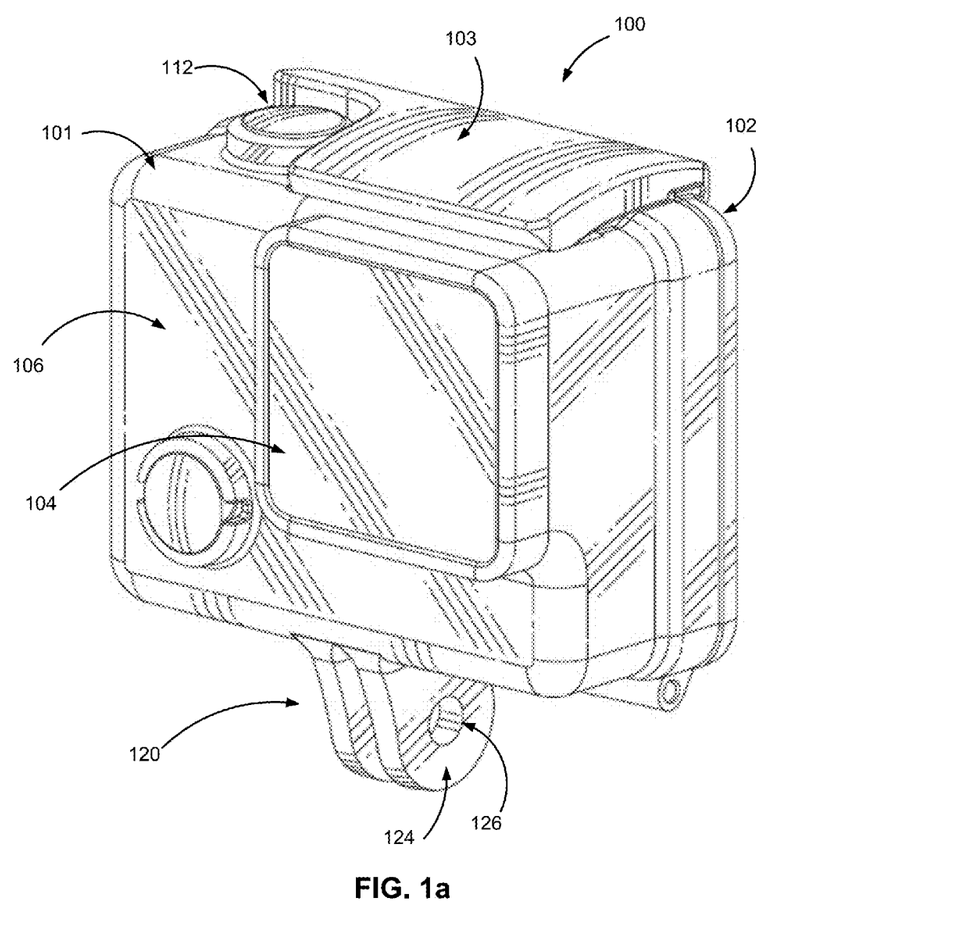
FIG. 1a illustrates a perspective view of a camera system, according to one embodiment.
Figure 1B:
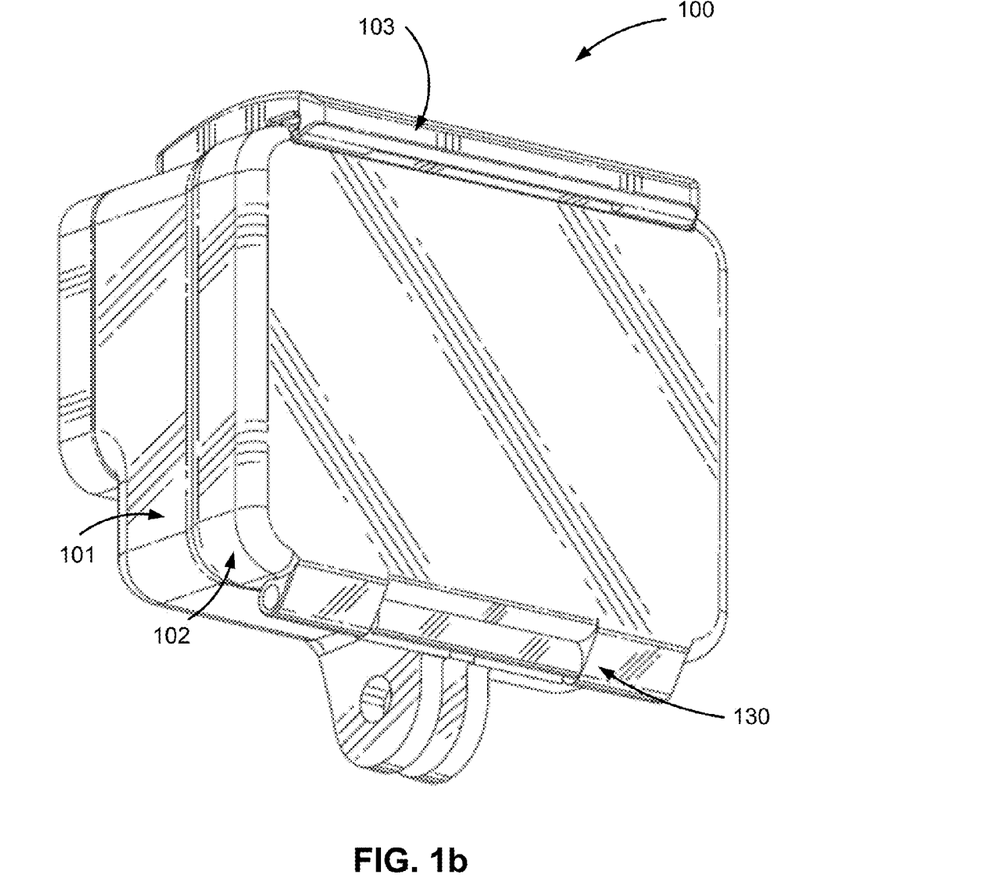
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
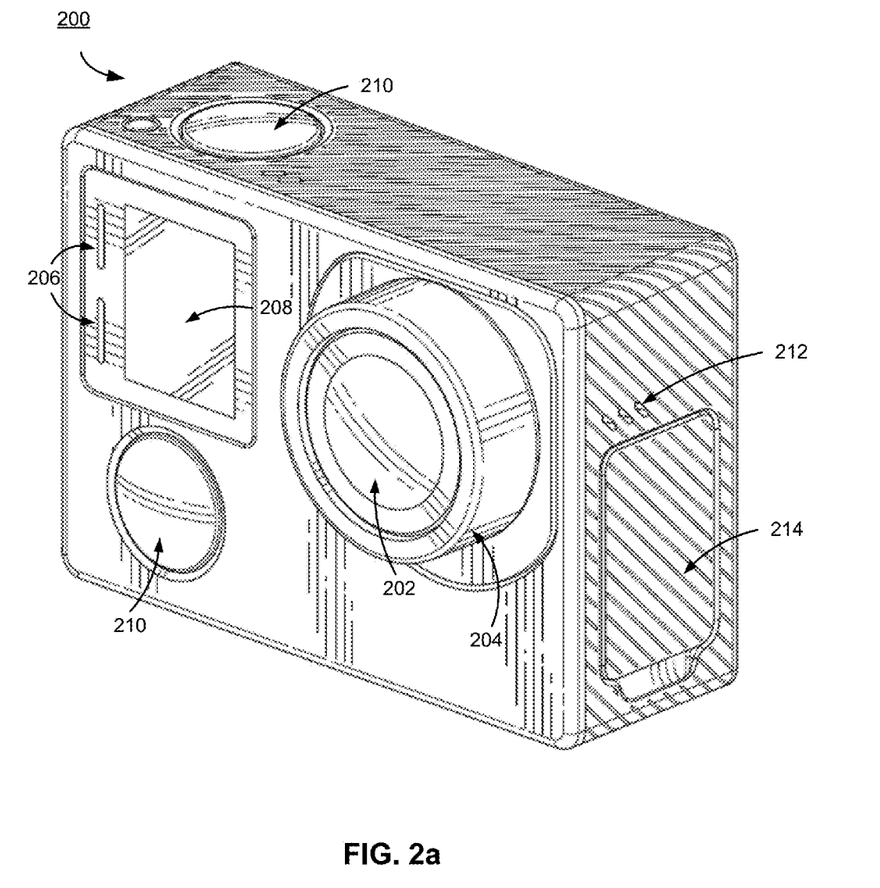
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. In some embodiments, the camera 200 includes one or more sets of microphones, with each set of microphones including a first microphone and a second, dampened microphone, where the second dampened microphone is configured to capture audio at approximately 20 dB (or any other suitable magnitude) less than the first microphone. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
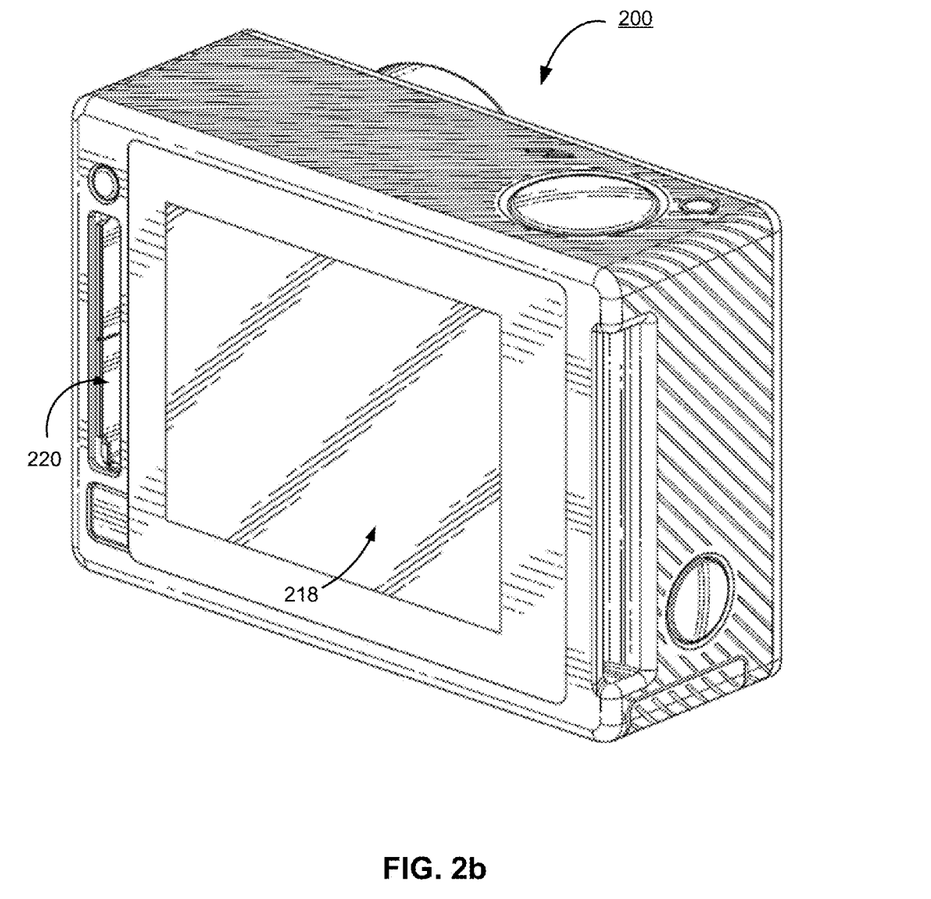
FIG. 2b illustrates a perspective view of a rear of a camera for use with the camera system, according to one embodiment.

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Configuration

Figure 3:
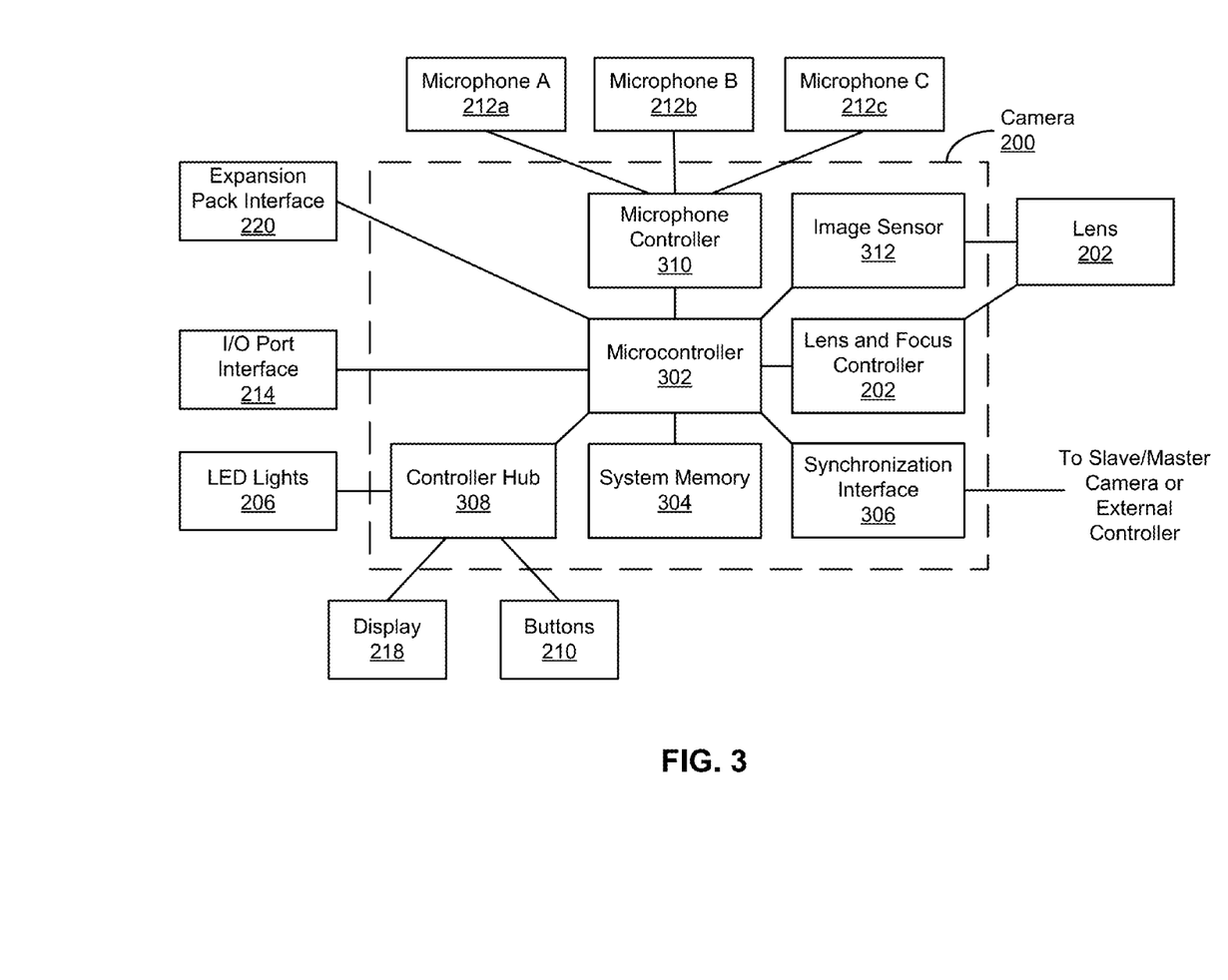
FIG. 3 is a block diagram illustrating electronic components of a camera, according to one embodiment.

FIG. 3 is a block diagram illustrating electronic components of a camera, such as the camera 200, according to one embodiment. The camera 200 includes one or more microcontrollers 302 (such as a processor) that control the operation and functionality of the camera 200. A lens and focus controller 302 is configured to control the operation and configuration of the camera lens 202, for instance based on user input or based on analysis of captured image data. A system memory 304 is configured to store executable computer instructions that, when executed by the microcontroller 302, perform the camera functionalities described herein. A synchronization interface 306 is configured to synchronize the camera 200 with other cameras or with other external devices, such as a remote control, a second camera (such as a slave camera or master camera), an external controller, or a smartphone.

A controller hub 308 transmits and receives information from user I/O components. In one embodiment, the controller hub 308 interfaces with the LED lights 206, the display 208, and the buttons 210. However, the controller hub 308 can interface with any conventional user I/O component or components. For example, the controller hub 308 may send information to other user I/O components, such as a speaker.

A microphone controller 310 receives and captures audio signals from one or more microphones, such as microphone 212a, microphone 212b, and microphone 212c. In some embodiments, a first of the microphones captures audio at a decibel threshold below a second of the microphones. In such embodiments, the first microphone is referred to as the "dampened microphone", and the second microphone is referred to as the "standard microphone". Although the embodiment of FIG. 3 only illustrates three microphones, in practice, the camera can include any number of microphones, for instance two or more pairs of microphones, wherein each pair includes a standard microphone and a dampened microphone. It should be noted that in some embodiments, a standard microphone and a corresponding dampened microphone are co-located (located within a threshold distance of each other), and are configured to capture the same audio data at different magnitudes (mono audio data, as opposed to stereo audio data).

The microphone controller 310 is configured to control the operation of the microphones 212. In some embodiments, the microphone controller 310 selects microphones from which audio data is captured. For instance, for a camera 200 with multiple microphone pairs (each pair including a standard microphone and a dampened microphone), the microphone controller 310 selects one microphone of the pair to capture audio data. In embodiments where audio data captured by the standard microphone does not clip, the microphone controller 310 can select the standard microphone as the microphone from which audio data is captured. In embodiments where audio data captured by the standard microphone is clipped, the microphone controller 310 can detect the clipped audio data, and can select the dampened microphone as the microphone from which audio data is captured. When the dampened microphone is selected, the microphone controller 310 can amplify the audio data captured by the dampened microphone by a gain equal to the gain difference between the standard microphone and the dampened microphone to minimize the audio disruption when switching from the standard microphone to the dampened microphone. Accordingly, the microphone controller 310 can determine the gain difference between the dampened microphone and the standard microphone, as described in greater detail below.

Additional components connected to the microcontroller 302 include an I/O port interface 214 and an expansion pack interface 220. The I/O port interface 214 may facilitate the camera 200 in receiving or transmitting video or audio information through an I/O port. Examples of I/O ports or interfaces include USB ports, HDMI ports, Ethernet ports, audioports, and the like. Furthermore, embodiments of the I/O port interface 214 may include wireless ports that can accommodate wireless connections. Examples of wireless ports include Bluetooth, Wireless USB, Near Field Communication (NFC), and the like. The expansion pack interface 220 is configured to interface with camera add-ons and removable expansion packs, such as an extra battery module, a wireless module, and the like.

Microphone Level Estimation

Figure 4:
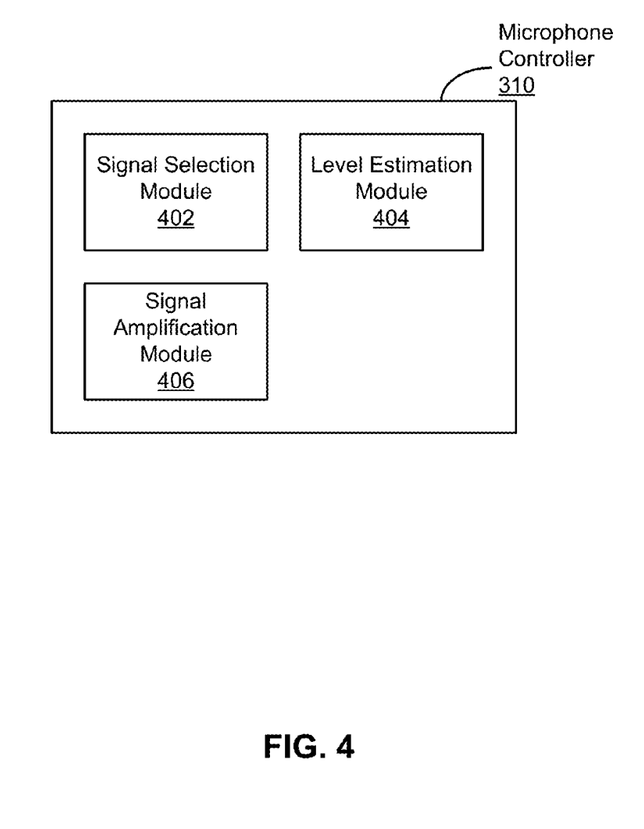
FIG. 4 is a block diagram illustrating an example microphone controller, according to one embodiment.

FIG. 4 is a block diagram illustrating an example microphone controller, such as the microphone controller 310, according to one embodiment. In various embodiments, the microphone controller may include a signal selection module 402, a level estimation module 404, and a signal amplification module 406. The signal selection module 402 is configured to select an audio signal from the audio signals produced by the one or more microphones (e.g., microphones A-C 212a-c). The level estimation module 404 is configured to determine a gain or amplitude difference between an audio signal selected by the signal selection module 402 and the audio signal produced by the standard microphone. The signal amplification module 406 is configured to amplify the audio signal selected by the signal selection module 404 by the determined gain difference such that the apparent aural transition between selected microphones is seamless (e.g., free of apparent audio artifacts or sudden amplitude changes).

The signal selection module 402 is configured to select an audio signal from the audio signals produced by the one or more microphones at a time point. That is, the signal selection module 402 is configured to select, from audio signals produced by the one or more microphones, an audio signal to be stored. For example, the signal selection module 402 may select an audio signal from the audio signals produced by the microphones A-C 212 a-c. The signal selection module 402 is configured to select the audio signal, at a particular time point, that has the best sound quality. That is, the audio signal having the highest signal to noise ratio (SNR) is selected. For example, in some embodiments, the audio signal produced by the standard microphone is selected as long as it is not clipping, because compared to the audio signal produced by the dampened microphone, the audio signal produced by the standard microphone has a better relative SNR (e.g., because both signals have the same noise floor). When the audio signal produced by the standard microphone clips, the audio signal produced by the dampened microphone can be selected. In some embodiments, the audio signal produced by the standard microphone is selected even when it is clipped, in response to a determination by the signal selection module that the SNR of the audio signal produced by the standard microphone is greater than the SNR of the audio signal produced by the dampened microphone.

The level estimation module 404 is configured to determine the gain/amplitude difference (or "level difference") between the selected audio signal and the audio signal produced by the standard microphone when the signal selection module 402 selects an audio signal other than the audio signal captured by the standard microphone. In some embodiments, the level estimation module 404 detects the level difference by determining and comparing the time averaged root mean square ("RMS") levels of the signals over a period of time. The level difference is determined as the ratio of the time average RMS level of the audio signal produced by the standard microphone to the time average RMS level of the selected audio signal (e.g., the audio signal produced by the dampened microphone).

In some embodiments, the level estimation module 404 detects the level difference by comparing the slopes of corresponding points within the audio signal waveforms. In various embodiments, slopes of audio signal waveforms at zero crossings (locations within an audio signal waveform at which the audio signal crosses the x-axis of the waveform graph) are determined. The slope of an audio signal waveform at a zero crossing can be determined by determining the value of the derivative of the audio signal waveform at a time associated with the zero crossing. Averaged slope values of audio signals can also be determined over a period of time. The level difference is determined by the level estimation module 402 as the ratio between the slope (or the average of slope values over a period of time) of one signal (e.g., the audio signal produced by the standard microphone) to the slope (or the average of slope values over the period of time) of the selected signal (e.g., the audio signal produced by the dampened microphone). It should be noted that, as discussed below with regards to FIGS. 5a and 5b, an RMS measure of slope values determined over time can be used to determine a level difference (as opposed to merely averaging slope values).

When an audio signal other than the signal produced by the standard microphone is selected by the signal selection module 402, the signal amplification module 406 is configured to amplify the selected audio signal by the level difference determined by the level estimation module 404. That is, the audio signal is amplified by a gain based on the level difference determined by the level estimation module 404.

Figure 5A:
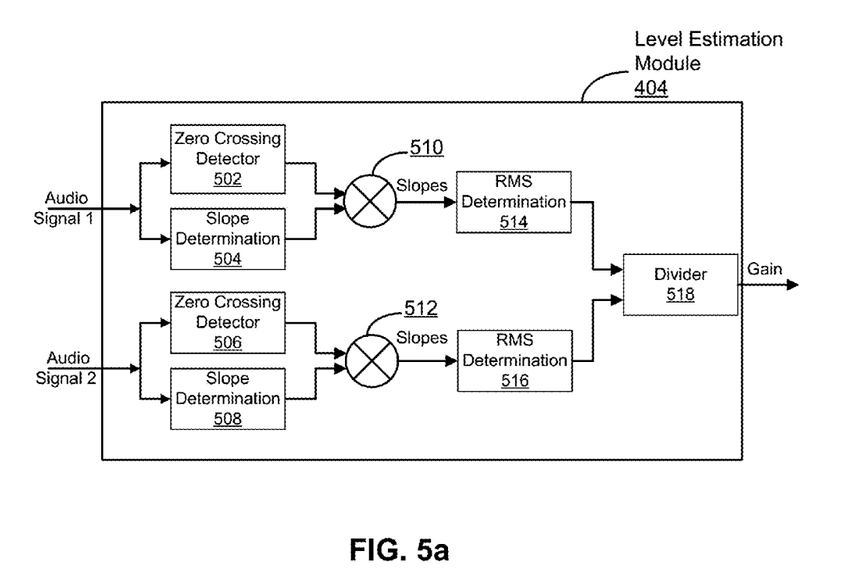
FIG. 5a illustrates a block diagram of an example level estimation module, according to one embodiment.
Figure 5B:
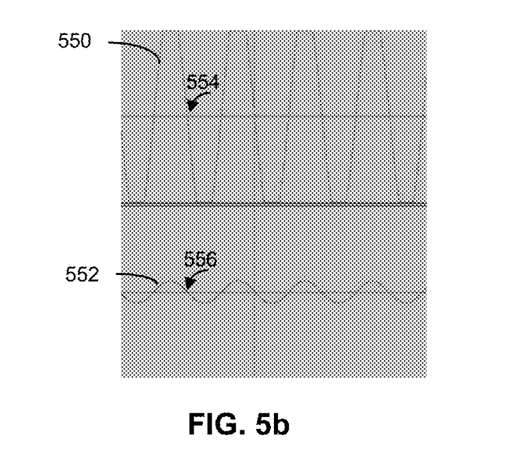
FIG. 5b illustrates example audio signals.

FIG. 5a illustrates a block diagram of an example level estimation module, such as the level estimation module 404, according to one embodiment. FIG. 5a is discussed in connection with FIG. 5b, which illustrates example audio signals. The level estimation module 404 includes multiple inputs, each of which is an audio signal produced by one microphone. For example, in the illustrated example, the level estimation module 404 includes two inputs, each of which receives an audio signal (e.g., the audio signal 550 and the audio signal 552). The two audio signals are produced by different microphones having different sensitivities. For example, the audio signal 550 is produced by a standard microphone and the audio signal 552 is produced by a dampened microphone. The standard microphone and the dampened microphone capture the same sound but output audio signals having different magnitudes. When the sound amplitude passes a certain threshold, the audio signal produced by the standard microphone starts to clip. As illustrated in FIG. 5b, the audio signal 550 produced by the standard microphone is clipped whereas the audio signal 552 produced by the dampened microphone is not. The microphone controller selects the audio signal 552 when the audio signal 550 is clipped.

As illustrated in FIG. 5a, both signals are provided to a zero crossing detector (e.g., the zero crossing detector 502 or 506) which is configured to detect the zero crossings of an audio signals. A zero crossing detector outputs an indicator value (e.g., a value of "1") when the amplitude of an audio signal is equal to zero and outputs a placeholder value (e.g., "0") when the amplitude of the audio signal is not equal to zero. It should be noted that in other embodiments, the zero crossing detector outputs times at which the amplitude of the audio signal is zero.

In addition, both audio signals are provided to slope determination modules (e.g., the slope determination module 504 or 508) which is configured to determine the slope of an audio signal. A slope determination module outputs a measure of a slope of an audio signal. For example, the slope determination module outputs the value of the derivative of an audio signal. Outputs of a zero crossing detector (e.g., the zero crossing detector 502 or 506) and a slope determination module (e.g., the slope determination module 504 or 508) are provided to a multiplier (e.g., the multiplier 510 or 512), which is configured to multiply the zero crossing output (from the zero crossing detector) by the slope output (from the slope determination module). In embodiments where the zero crossing detector outputs a "1" when a zero crossing is detected and a "0" otherwise, the product output by the multiplier is the slope of the received audio signal at a zero crossing. It should be noted that, in other embodiments, instead of multipliers 510, 512, the level estimation module 404 can include multiplexors configured to output slopes received from the slope determination modules 504, 508 when a zero-crossing control signal is received from the zero crossing detectors 502, 504. Alternatively, instead of multipliers 510, 512, the level estimation module 404 can include controllers configured to output the slope values received from the slope determination module 504, 508 when the indicators received from the zero crossing detectors 502, 506 indicate a zero crossing of an audio signal.

An RMS determination module (e.g., the RMS determination module 514 or 516) determines an RMS measure of the slopes of an audio signal (e.g., the audio signal 550 or 552) at zero crossings over a period of time (e.g., 1000 milliseconds), respectively. The divider 518 determines the ratio of the time averaged RMS values of slopes of the audio signals at zero crossings (for instance, the ratio of the RMS value received from the RMS determination module 514 to the RMS value received from the RMS determination module 516). As such, the level difference between the audio signals produced by different microphones is determined. The level estimation module 404, as illustrated, is agnostic to time shifts in cases when there is strong clipping. For example, an audio signal 550 at the zero crossing 554 corresponds to an audio signal 552 at the zero crossing 556. By determining the ratio between the slope of the audio signal 550 at zero crossing 554 and the slope of the audio signal 552 at zero crossing 556, the level difference between the audio signals 550 and 552 can be determined and the time shift between the audio signal 550 and the audio signal 552 can be accounted for.

In a use case, when a first audio signal captured by a standard microphone does not clip, the signal selection module 402 selects the first audio signal and stores the first audio signal without applying a gain to the first audio signal. At a later point in time, when the first audio signal begins clipping, the signal selection module 402 can select a second audio signal captured by a dampened microphone. The level estimation module 404 determines a gain between the first audio signal and the second audio signal, the signal amplification module 406 applies the gain to the second audio signal, and the amplified second audio signal is stored. By applying the gain between the first audio signal and the second audio signal at the transition point between selecting the first audio signal and the second audio signal, sudden changes in amplitude of the resulting stored audio signal can be substantially reduced, reducing audio artifacts, and potentially increasing the quality of captured video.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a multiple-microphone camera as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A camera, comprising:
   a first microphone configured to capture audio over a time interval to produce a first captured audio signal;
   a second microphone configured to capture audio over the time interval to produce a second captured audio signal, the second captured audio signal dampened relative to the first captured audio signal by a dampening factor; and
   a microphone controller coupled to the first microphone and the second microphone, the microphone controller configured to:
      in response to a determination that the first captured audio signal does not clip, store the first captured audio signal; and
      in response to a determination that the first captured audio signal clips:
         identify a first slope of the first captured audio signal at a first zero crossing of a measure of amplitude of the first captured audio signal;
         identify a second slope of the second captured audio signal at a second zero crossing of the measure of amplitude of the second captured audio signal, the second zero crossing corresponding to the first zero crossing;
         identify a gain comprising a ratio of the first slope to the second slope;
         amplify the second captured audio signal based on the identified gain; and
         store the amplified second captured audio signal.

2. The camera of claim 1, wherein identifying a gain between the first captured audio signal and the second captured audio signal comprises:
   determining a first averaged Root Mean Square (RMS) representation of the first captured audio signal and a second averaged RMS representation of the second captured audio signal;
   wherein the identified gain is a ratio of the first averaged RMS to the second averaged RMS.

3. The camera of claim 1, wherein identifying the gain comprises:
   identifying a first set of slopes of the first captured audio signal at a first set of zero crossings of measures of amplitude of the first captured audio signal;
   identifying a second set of slopes of the second captured audio signal at a second set of zero crossings of the measures of amplitude of the second captured audio signal, each of the second set of zero crossings corresponding to a different one of the first set of zero crossings; and
   determining a first average of the identified first set of slopes and a second average of the identified second set of slopes;
   wherein the identified gain is a ratio of the first average of the identified first set of slopes to the second average of the identified second set of slopes.

4. The camera of claim 1, wherein the first slope is the value of a derivative of the first captured audio signal at the first zero crossing and the second slope is the value of a derivative of the second captured audio signal at the second zero crossing.

5. The camera of claim 1, wherein the first microphone and the second microphone comprise a membrane microphone.

6. The camera of claim 1, wherein a level difference between the first captured audio signal and the second captured audio signal is substantially 20 dB.

7. A method of recording audio and video, comprising:
   producing a first captured audio signal by using a first microphone configured to capture audio over a time interval;
   producing a second captured audio signal by using a second microphone configured to capture audio over the time interval, the second captured audio signal dampened relative to the first captured audio signal by a dampening factor;
   in response to a determination that the first captured audio signal does not clip, storing the first capture audio signal; and
   in response to a determination that the first captured audio signal does clip:
      identify a first slope of the first captured audio signal at a first zero crossing of a measure of amplitude of the first captured audio signal;
      identify a second slope of the second captured audio signal at a second zero crossing of the measure of amplitude of the second captured audio signal, the second zero crossing corresponding to the first zero crossing;
      identify a gain comprising a ratio of the first slope to the second slope;

amplifying the second captured audio signal based on the identified gain; and storing the amplified second captured audio signal.

8. The method of claim 7, wherein identifying a gain between the first captured audio signal and the second captured audio signal comprises:

determining a first averaged Root Mean Square (RMS) representation of the first captured audio signal and a second averaged RMS representation of the second captured audio signal;

wherein the identified gain is a ratio of the first averaged RMS to the second averaged RMS.

9. The method of claim 7, wherein identifying the gain comprises:

identifying a first set of slopes of the first captured audio signal at a first set of zero crossings of measures of amplitude of the first captured audio signal;

identifying a second set of slopes of the second captured audio signal at a second set of zero crossings of the measures of amplitude of the second captured audio signal, each of the second set of zero crossings corresponding to a different one of the first set of zero crossings; and determining a first average of the identified first set of slopes and a second average of the identified second set of slopes;

wherein the identified gain is a ratio of the first average of the identified first set of slopes to the second average of the identified second set of slopes.

10. The method of claim 7, wherein the first slope is the value of a derivative of the first captured audio signal at the first zero crossing and the second slope is the value of a derivate of the second captured audio signal at the second zero crossing.

11. The method of claim 7, wherein the first microphone and the second microphone comprise a membrane microphone.

12. The method of claim 7, wherein a level difference between the first captured audio signal and the second captured audio signal is substantially 20 dB.

13. A non-transitory computer-readable storage medium storing executable instructions for recording audio and video in a camera, the instructions, when executed by a hardware processor, configured to perform steps comprising:

producing a first captured audio signal by using a first microphone configured to capture audio over a time interval;

producing a second captured audio signal by using a second microphone configured to capture audio over the time interval, the second captured audio signal dampened relative to the first captured audio signal by a dampening factor;

in response to a determination that the first captured audio signal does not clip, storing the first capture audio signal; and in response to a determination that the first captured audio signal does clip:

identifying a first slope of the first captured audio signal at a first zero crossing of a measure of amplitude of the first captured audio signal;

identifying a second slope of the second captured audio signal at a second zero crossing of the measure of amplitude of the second captured audio signal, the second zero crossing corresponding to the first zero crossing;

identifying a gain comprising a ratio of the first slope to the second slope;

identifying a gain between the first captured audio signal and the second captured audio signal representative of the dampening factor;

amplifying the second captured audio signal based on the identified gain; and storing the amplified second captured audio signal.

14. The non-transitory computer-readable storage medium of claim 13, wherein identifying a gain between the first captured audio signal and the second captured audio signal comprises:

determining a first averaged Root Mean Square (RMS) representation of the first captured audio signal and a second averaged RMS representation of the second captured audio signal;

wherein the identified gain is a ratio of the first averaged RMS to the second averaged RMS.

15. The non-transitory computer-readable storage medium of claim 13, wherein identifying a gain comprises:

identifying a first set of slopes of the first captured audio signal at a first set of zero crossings of measures of amplitude of the first captured audio signal;

identifying a second set of slopes of the second captured audio signal at a second set of zero crossings of the measures of amplitude of the second captured audio signal, each of the second set of zero crossings corresponding to a different one of the first set of zero crossings; and determining a first average of the identified first set of slopes and a second average of the identified second set of slopes;

wherein the identified gain is a ratio of the first average of the identified first set of slopes to the second average of the identified second set of slopes.

16. The non-transitory computer-readable storage medium of claim 13, wherein the first slope is the value of a derivative of the first captured audio signal at the first zero crossing and the second slope is the value of a derivate of the second captured audio signal at the second zero crossing.

17. The non-transitory computer-readable storage medium of claim 13, wherein the first microphone and the second microphone comprise a membrane microphone.

* * * * *